Jan. 25, 1944.  P. H. PREBLE  2,339,944
REFRIGERATING APPARATUS
Filed Jan. 26, 1940

INVENTOR.
Paul H Preble
BY Spencer Hardman and Fehr
ATTORNEYS

Patented Jan. 25, 1944

2,339,944

UNITED STATES PATENT OFFICE 2,339,944

REFRIGERATING APPARATUS

Paul H. Preble, Concordia, Kans., assignor to General Motors Corporation, Dayton, Ohio, a corporation of Delaware Application January 26, 1940, Serial No. 315,826

7 Claims. (Cl. 62—115)

This invention relates to refrigerating apparatus and more particularly to a refrigerating system which includes a primary and a secondary refrigerant circuit.

When systems employing a primary and a simple secondary system are used, the temperature of the secondary system normally follows the temperature of the primary system. It has been proposed to use valves in the secondary system to control the temperature of the secondary system but for systems to be used in household refrigeration and other systems produced in mass production, it is usually considered undesirable to introduce any moving parts, such as valves within the system. It has also been proposed to use a mixture of refrigerants or inert gas in the secondary refrigerant circuit but such expedients only serve to maintain a temperature differential between the primary and secondary circuits and do not prevent the fluctuation of temperature in the secondary circuit in response to change of fluctuation in temperature of the primary circuit.

It is therefore an object of my invention to provide means without moving parts in the secondary circuit which will keep the secondary circuit at a substantially constant temperature regardless of the fluctuations of the primary refrigerant circuit.

It is another object of my invention to vary the contact between the primary and secondary circuits in accordance with the fluctuations in temperature of the primary circuit in order to regulate and maintain substantially constant the temperature of the secondary refrigerant circuit.

It is still another object of my invention to control the heat transfer between the primary and secondary circuits in accordance with the temperature of the primary evaporator.

One of the common applications of a primary-secondary refrigerant circuit system is the two compartment refrigerator commonly known as a cold wall refrigerator which employs a secondary refrigerant circuit for cooling the food compartment. In such a refrigerator, a temperature regulator is ordinarily provided for varying the temperature of the primary evaporator. It is desirable to prevent fluctuations of the temperature of the food compartment cooled by the secondary refrigerant circuit through the cold wall in order to maintain a proper food preserving temperature at all times regardless of the fluctuations of temperature of the primary evaporator.

It is therefore an object of my invention to provide a two-compartment refrigerator having its food compartment cooled by a simple secondary refrigerant circuit in which the temperature of the primary evaporator may be varied without causing fluctuations of temperature in the food compartment.

Further objects and advantages of the present invention will be apparent from the following description, reference being had to the accompanying drawing, wherein a preferred form of the present invention is clearly shown.

Briefly, I have shown a household refrigerator in which a glass plate divides the cabinet into upper and lower compartments. A primary evaporator is provided in the upper compartment while the lower compartment, used for high humidity food storage, is cooled by a secondary refrigerant circuit which extends around the side, rear and bottom walls of the lower compartment. This secondary circuit has a condenser portion extending into the upper compartment. This condenser portion is removably clamped at several points to the bottom wall of the primary evaporator.

The primary refrigerating system is provided with a temperature regulator which controls the operation of the primary refrigerating system so that different temperatures may be maintained in the primary evaporator according to the position of the temperature regulator. In order to prevent the changes in setting of the temperature regulator from affecting the temperature maintained in the lower compartment, a manual adjusting means is provided for varying the contact between the condenser of the secondary circuit and the bottom wall of the primary evaporator. This manual adjusting means cooperates with indices corresponding to the indices of the temperature regulator. The manual adjusting means is so calibrated that when it is moved to the position marked correspondingly to the indicated position of the temperature regulator, the heat transfer between the primary evaporator and the secondary condenser is changed to compensate for the change in setting of the temperature regulator so that the temperature in the lower compartment is maintained substantially constant at a proper food preserving temperature at all times.

Figures 1, 2, 5:
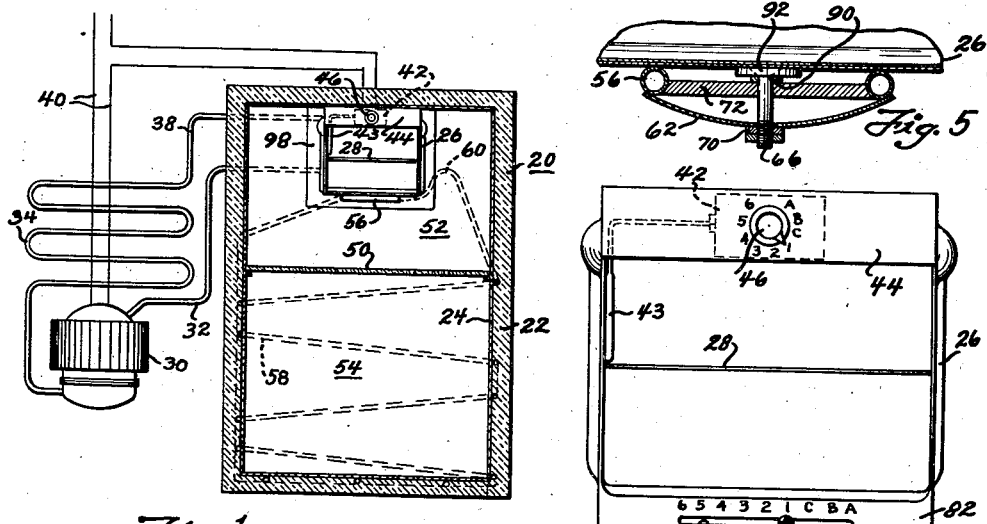
Fig. 1 is a sectional view, partly diagrammatic, of a two-compartment refrigerator and refrigerating system embodying one form of my invention.
Fig. 2 is an enlarged view in elevation of a primary evaporating means as shown in Fig. 1.
Fig. 5 is a sectional view taken along the line 5—5 of Fig. 3.

Referring now to the drawing and more particularly to Figs. 1 and 2 there is shown diagrammatically a refrigerator cabinet 20 having insulated walls 22 surrounding a metal inner liner member 24. A primary refrigerant evaporating means 26, generally conventional, is provided in the upper portion of the compartment enclosed by the inner liner member 24. This evaporating means 26 is generally U-shaped and is formed of a hollow plate-type unit having the side walls bent upwardly to form the U shape. The bottom of the U-shaped portion serves to receive ice trays and a shelf 28 is also provided for receiving ice trays. The bottom wall of the evaporator 26 preferably has its refrigerant passages formed on the inside of the evaporator so that the outer surface of the bottom wall may be made smooth.

The primary evaporator 26 is connected to the primary liquefying means which includes a sealed motor-compressor unit 30 for withdrawing evaporated refrigerant from the primary evaporator means 26 through the suction conduit 32 and for compressing the refrigerant and forwarding the compressed refrigerant to a condensing means 34. The compressed refrigerant is condensed in the condensing means 34 and returned to the primary evaporator 26 through a liquid conduit 38. The motor compressing unit is supplied with electric energy through an electrical circuit 40 under the control of a temperature regulating switch 42 provided behind the upper trim 44 of the evaporator 26.

This temperature regulating switch is operated in accordance with the temperature conditions of a thermostat bulb 43 provided upon the inside of the side wall of the primary evaporator 26. The temperature regulating switch 42 is provided with a temperature regulating knob 46 which may be turned to various positions indicated by the legends A B C 1, 2, 3, 4, 5, 6, provided surrounding the knob 46 upon the trim 44. The rotation of the knob provides a simple means for controlling the operation of the motor-compressor unit 30 so as to maintain the primary evaporator 26 at desired graduated temperatures ranging from the highest temperature indicated by the A position to the coldest temperature designated by the position 6. Such a temperature regulator frequently provides a range from 30° to 0° F. in the range extending from A to 6.

The interior of the inner liner 24 is divided by a glass plate or other suitable partition 50 which divides the interior into an upper low temperature low humidity region or compartment 52 containing the primary evaporator 26, and a lower region or compartment 54 of higher temperature than compartment 52 and primarily utilized for storing fruits and vegetables. The glass plate may be sealed to the walls of the inner liner and to the door by rubber gaskets or some sort of controlled circulation may be provided between the compartments 52 and 54. The upper region or compartment 52 is cooled directly by the presence of the primary evaporator 26, while the lower compartment 54 is cooled by the secondary refrigerant circuit including a condensing portion 56 removably connected to the bottom of the primary evaporator 26 and an evaporating portion 58 which is wrapped around the bottom, rear and side walls of the lower portion of the inner liner member 24 beneath the glass plate 50. A goose-neck 60 is provided in the secondary refrigerant circuit so as to control the direction of circulation therein. In the secondary refrigerant circuit, the condensed refrigerant is first fed to the portion of the secondary evaporator beneath the bottom wall after which the refrigerant passes around the rear and side walls, and finally rises over the goose-neck trap 60 into the condensing portion 56.

The secondary condenser 56 is normally held against the bottom of the primary evaporator 26 by bowed leaf springs 62 and 64 which straddle the incoming and outgoing sections of the condenser. These bowed springs 62 and 64 have their center portions threaded onto the studs 66 and 68 and are held in position by the nuts 70. The free ends of the bowed springs rest upon the opposite sections of the condenser tubing 56 and thus tend to hold the condenser tubing 56 against the bottom wall of the primary evaporator 26. Above the bowed springs 62 and 64 are the tie-bars 72 and 74 which likewise are loosely threaded onto the studs 66 and 68 and have their end portions soldered or welded to the tubing on the opposite sections of the condenser portion 56 of the secondary refrigerant circuit.

Normally it is desired to maintain the temperature and humidity in the lower region or compartment 54 substantially constant regardless of setting of the temperature regulator 46. It has been suggested that valves might be used in the secondary refrigerant circuit to control this temperature but valves in any sealed system are rather objectionable since valves are always subject to failure and in a sealed system the repair of such a valve is troublesome. I therefore control and maintain substantially constant the temperature and humidity within the compartment 54 by varying the heat transfer between the condensing portion 56 and the bottom of the primary evaporator 26 so as to reduce the heat transfer when the temperature of the primary evaporator is lowered and to increase the heat transfer when the temperature of the primary evaporator 26 is raised. I do this by a manually adjustable means which changes the distance between at least a portion of the condensing portion 56 and the bottom wall of the primary evaporator 26.

In order to do this I have provided a U-shaped operating lever 76 which is pivotally mounted upon a stud 78 located closer to the stud 68 than to the stud 66. The front end of this operating lever 76 is provided with a knob 80 which projects through the lower trim 82 of the evaporator 26. This lower trim 82 is provided with a slot 84 which receives the end portion of the operating lever 76. Above the slot 84 are the legends 6, 5, 4, 3, 2, 1, C B A, corresponding to the legends surrounding the temperature regulating knob 46 which provide means for indicating changes made in the setting of the manually adjustable means.

On either side of the stud 78 there are pivotally connected the links 86 and 88. The link 86 terminates in a wedge 90 which contains an elongated aperture receiving the stud 66. This wedge 90 extends between the connecting bar 72 and a stud supporting plate 92 provided at the connection of the stud 66 with the bottom wall of the evaporator 26. The link 88 likewise terminates in a wedge 94 provided with an elongated aperture which receives the stud 68. This wedge 94 extends between the tie-bar 74 and the stud plate 96.

Figure 3:
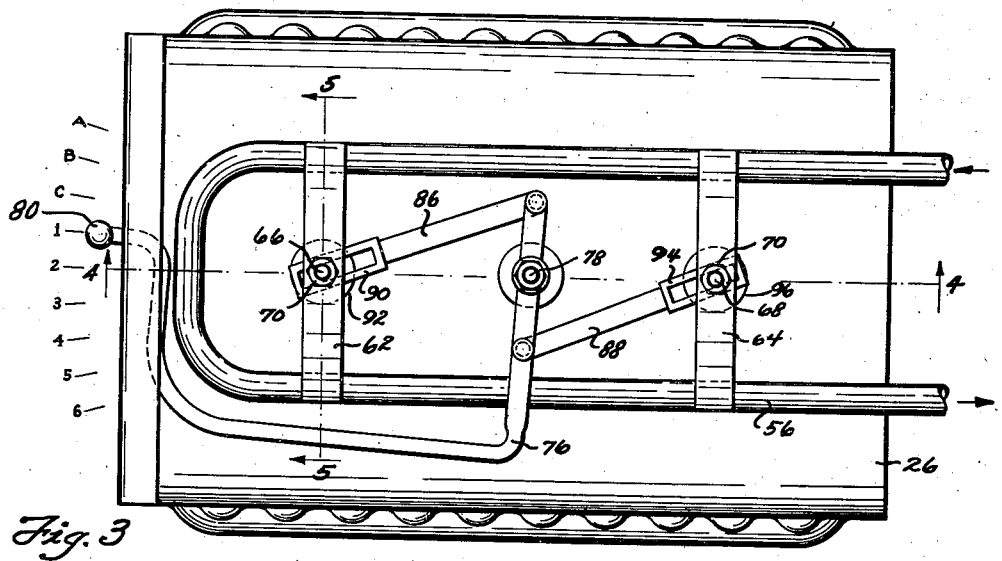
Fig. 3 is an enlarged bottom view of the evaporating means shown in Fig. 1.
Figure 4:
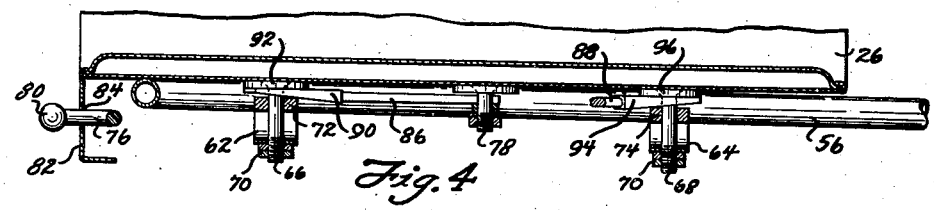
Fig. 4 is a sectional view taken along the line 4—4 of Fig. 3.

By positioning the pivot stud 78 closer to the stud 68 a greater movement is provided for the link 88. This arrangement is employed to cause the wedge 94 to engage and lower the tie-bar 74 prior to lowering of tie-bar 72 by engagement of the wedge 90 therewith. Therefore in the intermediate setting of the knob 80, such as the position 1 illustrated, the wedge 94 will engage the tie-bar 74 to lower the rear end of the condenser portion 56 away from the bottom of the primary evaporator 26 while the front end of the condenser portion remains in contact with the bottom wall (see Fig. 4). Further movement of the knob 80 toward the position 6 will cause the wedge 90 to engage the tie-bar 72 so that both tie-bars will be moved away from the bottom wall 26 of the primary evaporator. At this time the condenser portion 56 will be entirely out of contact with the bottom wall of the primary evaporator 26, but some heat transfer will still take place because of the slight space separating the condenser portion from the evaporator.

Normally frost will assist the heat transfer between the primary evaporator and the condenser portion 56. The wedges 90 and 94 are so proportioned that when the knob 80 is moved to the setting corresponding to the setting of the temperature regulating knob 46 the heat transfer between the condenser portion 56 and the bottom of the primary evaporator will be of such a value as to keep the compartment 54 at the proper temperature and humidity. When the knob is moved to the A position the wedges 90 and 94 will be entirely out of contact with the tie-bars 72 and 74 so that the condenser portion 56 will be held against the bottom of the primary evaporator 26 by the bowed springs 62 and 64. In the B and C positions the wedge 94 will gradually reduce the tension of the bowed springs applied to press the condenser portion against the bottom wall of the evaporator 26. Thus by this means the contact pressure between the condenser portion of the primary evaporator is gradually reduced and finally the condenser portion is entirely out of contact with the primary evaporator 26.

When it is desired to remove the primary refrigerating system from the cabinet 20 the nuts 70 are removed from the studs 66 and 68 after which the bowed springs 62 and 64 are removed thereby allowing the condenser portion 56 with its assembled tie-bars to be removed from the studs. The rear wall of the cabinet 20 is provided with a removable section 98 so that after its disconnection from the secondary circuit, the primary evaporator 26 may be removed through the rear of the cabinet. In this way the primary refrigerating system may be kept sealed at all times even when removed from the cabinet 20.

While the form of embodiment of the invention as herein disclosed, constitutes a preferred form, it is to be understood that other forms might be adopted, all coming within the scope of the claims which follow.

What is claimed is as follows:

1. Refrigerating apparatus including a closed primary refrigerant circuit and a closed secondary refrigerating circuit adapted to be in contact with the primary circuit, and means for changing the area of contact between the primary and secondary circuits for controlling heat transfer between the circuits.

2. Refrigerating apparatus including a closed primary refrigerant circuit and a closed secondary refrigerant circuit adapted to be in contact with the primary circuit, and means for controlling the contact pressure between the primary and secondary circuits.

3. Refrigerating apparatus including a primary refrigerant circuit enclosed in metal walls, a secondary refrigerant circuit enclosed in metal walls, a portion of the metal walls of the primary circuit being in contact with a portion of the metal walls of the secondary circuit, and means for varying the contact pressure between the walls of the primary and secondary circuits.

4. In the art of operating a refrigerating apparatus comprising a closed primary refrigerant circulating system including liquefying and evaporating means and a closed secondary fluid circulating system having one portion thereof adapted to engage in metal-to-metal contact with the evaporating means of the primary system for causing another portion of the secondary system to produce a refrigerating effect, the method of regulating the amount of refrigeration produced by said another portion of said secondary system which comprises, changing the area of contact between said one portion of the secondary system and said evaporating means of the primary system to control the heat transfer therebetween.

5. Refrigerating apparatus including a cabinet having a plurality of compartments therein, a closed primary refrigerating circuit associated with said cabinet and including an evaporator disposed in heat exchange relation with one of said compartments, a closed secondary refrigerating circuit associated with said cabinet having one portion in contact with the primary evaporator and another portion extending over walls of another of said compartments for cooling same, and means for changing the area of contact between said one portion of said secondary circuit and said primary evaporator for controlling heat transfer between the circuits.

6. A refrigerator comprising a cabinet having a food storage compartment, a primary refrigerating system including an evaporator for cooling one region of said compartment, a secondary refrigerating system including a cooling portion constructed and arranged for cooling another region of said compartment and a condensing portion, said evaporator including a wall having refrigerant fluid of the primary system therein, said condensing portion of the secondary refrigerating system extending along and normally being in metal-to-metal contact with said evaporator wall, and means for changing the area of metal-to-metal contact between the condensing portion of the secondary refrigerating system and said evaporator wall to regulate the heat transfer between said system.

7. A refrigerator comprising a cabinet having a food storage compartment, a primary refrigerating system including an evaporator for cooling one region of said compartment, a secondary refrigerating system including a cooling portion constructed and arranged for cooling another region of said compartment and a condensing portion, said evaporator including a wall having refrigerant fluid of the primary system therein, said condensing portion of the secondary refrigerating system extending along and normally being in metal-to-metal contact with said evaporator wall, means for changing the area of metal-to-metal contact between the condensing portion of the secondary refrigerating system and said evaporator wall to regulate the heat transfer between said systems, and means for indicating the change made by said first named means.

PAUL H. PREBLE.